(12) United States Patent
Li (10) Patent No.: US 11,467,380 B2
(45) Date of Patent: Oct. 11, 2022

(54) CAMERA OPTICAL LENS

(71) Applicant: AAC Optics Solutions Pte. Ltd., Singapore (SG)

(72) Inventor: Wanxia Li, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 291 days.

(21) Appl. No.: 16/989,913

(22) Filed: Aug. 11, 2020

(65) Prior Publication Data
US 2021/0048639 A1  Feb. 18, 2021

(30) Foreign Application Priority Data
Aug. 16, 2019  (CN) .......................... 201910760200.X (51) Int. Cl.
| | |
|---|---|
| G02B 9/60 | (2006.01) |
| G02B 13/00 | (2006.01) |
| G02B 7/02 | (2021.01) |
| G02B 13/18 | (2006.01) |
| G02B 27/00 | (2006.01) |
| G02B 5/00 | (2006.01) |
| G02B 3/04 | (2006.01) |

(52) U.S. Cl.
CPC ......... G02B 13/0045 (2013.01); G02B 7/021 (2013.01); G02B 13/18 (2013.01); G02B 27/0025 (2013.01); G02B 3/04 (2013.01); G02B 5/005 (2013.01); G02B 9/60 (2013.01)

(58) Field of Classification Search
CPC ...... G02B 13/0045; G02B 9/60; G02B 13/18; G02B 5/005; G02B 27/0025; G02B 3/04; G02B 7/021

USPC ................. 359/714, 740, 763, 770
See application file for complete search history.

(56) References Cited

U.S. PATENT DOCUMENTS

| | | | |
|---|---|---|---|
| 10,712,539 B2 * | 7/2020 | Sato ................... | G02B 13/0045 |
| 11,226,471 B2 * | 1/2022 | Jia ....................... | G02B 13/0045 |
| 2020/0292790 A1 * | 9/2020 | Jung ................... | G02B 13/0045 |
| 2021/0263287 A1 * | 8/2021 | Wenren ............... | G02B 13/0045 |
| 2021/0333514 A1 * | 10/2021 | Zhou .................... | G02B 9/62 |
| 2021/0349291 A1 * | 11/2021 | Yu ........................ | G02B 9/60 |
| 2022/0121014 A1 * | 4/2022 | Liu ...................... | G02B 13/0045 |

FOREIGN PATENT DOCUMENTS

| | | | | |
|---|---|---|---|---|
| CN | 109425953 B | * | 12/2020 | ......... G02B 13/0045 |
| CN | WO 2021/000590 A1 | * | 7/2021 | ............... G02B 9/60 |
| JP | 2021033278 A | * | 7/2020 | ............... G02B 9/60 |

* cited by examiner

*Primary Examiner* — Evelyn A Lester
(74) *Attorney, Agent, or Firm* — W&G Law Group (57) ABSTRACT

The present invention relates to the technical field of optical lens and discloses a camera optical lens satisfying the following conditions: $-1.00 \leq (f1+f2)/f \leq -0.10$, $12.00 \leq d3/d4 \leq 20.00$, $5.00 \leq R5/d5 \leq 11.00$, $8.00 \leq d7/d8 \leq 14.00$; where f1 and f2 respectively denote a focal length of a first and second lenses, d3, d5 and d7 respectively denote an on-axis thickness of the second, third and fourth lenses, d4 denotes an on-axis distance from an image-side surface of the second lens to an object-side surface of the third lens, d8 denotes an on-axis distance from an image-side surface of the fourth lens to an object-side surface of the fifth lens, and R5 denotes a curvature radius of the object-side surface of the third lens. The camera optical lens has good optical functions and satisfies a design requirement of wide angle and ultra-thinness.

10 Claims, 6 Drawing Sheets

CAMERA OPTICAL LENS

TECHNICAL FIELD

The present disclosure relates to the field of optical lens, in particular, to a camera optical lens suitable for handheld devices, such as smart phones and digital cameras, and imaging devices, such as monitors or PC lenses.

BACKGROUND

In recent years, as smart phones are becoming popular, there is an increasing requirement for miniaturized camera lenses. However, generally speaking, a photosensitive device for a camera lens is no more than a charge coupled device (CCD) or a complementary metal-oxide semiconductor sensor (CMOS Sensor). Besides, thanks to development to semiconductor manufacturing processes, a pixel size of the photosensitive device are getting smaller, in addition to the current development trend of electronic products going towards better functions and thinner and smaller dimensions, miniature camera lenses with good imaging quality is becoming a mainstream in the market.

In order to obtain better imaging quality, a mini-lens that is traditionally equipped in a mobile phone camera adopts a three-piece or four-piece and even five-piece or six-piece lens structure. However, as technology develops and user's requirements are more and more diversified, in a case that a pixel area of the photosensitive device is reducing while a requirement on imaging quality is increasing, though a lens as such has good optical functions, the lens is fairly unreasonable in terms of refractive power, distance between lenses and lens shape, rendering that the lens structure with good optical functions can not satisfy a design requirement of large aperture, ultra-thinness and wide angle.

SUMMARY

To address the above issues, the present disclosure seeks to provide a camera optical lens that satisfies a design requirement of large aperture, ultra-thinness and wide angle while having good optical functions.

In order to address the above issues, embodiments of the present disclosure provides a camera optical lens, from an object side to an image side: a first lens having a negative refractive power; an aperture; a second lens having a positive refractive power; a third lens having a negative refractive power; a fourth lens having a positive refractive power; and a fifth lens having a negative refractive power; wherein the camera optical lens satisfies following conditions:

$$-1.00 \leq (f1+f2)/f \leq -0.10;$$

$$12.00 \leq d3/d4 \leq 20.00;$$

$$5.00 \leq R5/d5 \leq 11.00; \text{ and}$$

$$8.00 \leq d7/d8 \leq 14.00;$$

where f denotes a focal length of the camera optical lens, f1 denotes a focal length of the first lens, f2 denotes a focal length of the second lens, d3 denotes an on-axis thickness of the second lens, d4 denotes an on-axis distance from an image-side surface of the second lens to an object-side surface of the third lens, d5 denotes an on-axis thickness of the third lens, d7 denotes an on-axis thickness of the fourth lens, d8 denotes an on-axis distance from an image-side surface of the fourth lens to an object-side surface of the fifth lens, and R5 denotes a curvature radius of the object-side surface of the third lens.

As an improvement, the camera optical lens further satisfies the following condition:

$$0.05 \leq (R3+R4)/(R3-R4) \leq 0.50;$$

where R3 denotes a curvature radius of an object-side surface of the second lens, and R4 denotes a curvature radius of the image-side surface of the second lens.

As an improvement, the camera optical lens further satisfies the following condition:

$$-9.00 \leq (f1+f3+f5)/f \leq -6.50;$$

where f3 denotes a focal length of the third lens, and f5 denotes a focal length of the fifth lens.

As an improvement, the camera optical lens further satisfies the following conditions:

$$-3.71 \leq f1/f \leq -0.76;$$

$$-0.03 \leq (R1+R2)/(R1-R2) \leq 0.67;$$

$$0.03 \leq d1/TTL \leq 0.11;$$

where R1 denotes a curvature radius of an object-side surface of the first lens, R2 denotes a curvature radius of an image-side surface of the first lens, d1 denotes an on-axis thickness of the first lens, and TTL denotes a total optical length from the object-side surface of the first lens to an image surface of the camera optical lens along an optical axis.

As an improvement, the camera optical lens according further satisfies the following conditions:

$$0.43 \leq f2/f \leq 1.51; \text{ and}$$

$$0.08 \leq d3/TTL \leq 0.31;$$

where TTL denotes a total optical length from an object-side surface of the first lens to an image surface of the camera optical lens along an optical axis.

As an improvement, the camera optical lens further satisfies the following conditions:

$$-13.07 \leq f3/f \leq -2.12;$$

$$1.64 \leq (R5+R6)/(R5-R6) \leq 7.61; \text{ and}$$

$$0.03 \leq d5/TTL \leq 0.17;$$

were f3 denotes a focal length of the third lens, R6 denotes a curvature radius of an image-side surface of the third lens, and TTL denotes a total optical length from an object-side surface of the first lens to an image surface of the camera optical lens along an optical axis.

As an improvement, the camera optical lens further satisfies following conditions:

$$0.48 \leq f4/f \leq 1.85;$$

$$0.62 \leq (R7+R8)/(R7-R8) \leq 3.25; \text{ and}$$

$$0.06 \leq d7/TTL \leq 0.24;$$

where f4 denotes a focal length of the fourth lens, R7 denotes a curvature radius of an object-side surface of the fourth lens, R8 denotes a curvature radius of the image-side surface of the fourth lens, and TTL denotes a total optical length from an object-side surface of the first lens to an image surface of the camera optical lens along an optical axis.

As an improvement, the camera optical lens further satisfies following conditions:

$$-3.14 \leq f5/f \leq -0.88;$$

$$1.23 \leq (R9+R10)/(R9-R10) \leq 0.89; \text{ and}$$

$$0.04 \leq d9/TTL \leq 0.14;$$

where f5 denotes a focal length of the fifth lens, R9 denotes a curvature radius of the object-side surface of the fifth lens, R10 denotes a curvature radius of an image-side surface of the fifth lens, d9 denotes an on-axis thickness of the fifth lens, and TTL denotes a total optical length from an object-side surface of the first lens to an image surface of the camera optical lens along an optical axis.

As an improvement, the camera optical lens further satisfies following conditions:

$$0.48 \leq f12/f \leq 2.68;$$

where f12 denotes a combined focal length of the first lens and second lens.

As an improvement, the camera optical lens further satisfies following conditions:

$$TTL/IH \leq 0.30;$$

where TTL denotes a total optical length from an object-side surface of the first lens to an image surface of the camera optical lens along an optical axis, and IH denotes an image height of the camera optical lens.

The present disclosure is advantageous in:

compared with existing technologies, the camera optical lens in the present disclosure has good optical functions and has characteristics of large aperture, wide angle and ultra-thinness, and is especially fit for WEB camera lenses and mobile phone camera lens assemblies composed by such camera elements as CCD and CMOS for high pixels.

DETAILED DESCRIPTION OF EMBODIMENTS

The present disclosure will be further described below with reference to the drawings and embodiments.

To make the objects, technical solutions, and advantages of the present disclosure clearer, embodiments of the present disclosure are described in detail with reference to accompanying drawings in the following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

Embodiment 1

Figure 1:
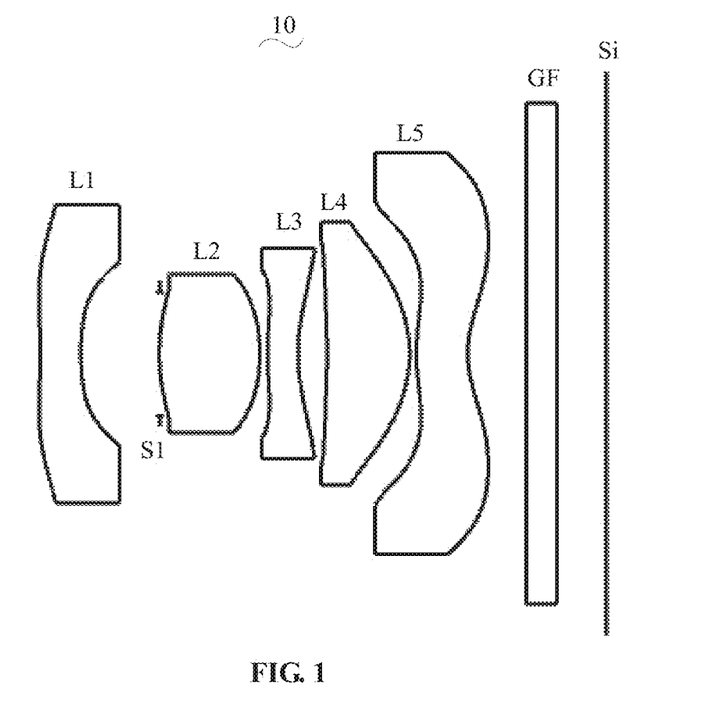
FIG. 1 is a schematic diagram of a structure of a camera optical lens according to Embodiment 1 of the present disclosure.

With reference to FIGS. 1 to 4, the present disclosure provides a camera optical lens 10 of Embodiment 1 of the present disclosure. In FIG. 1, a left side is an object side, a right side is an image side. The camera optical lens 10 includes five lenses arranged coaxially, from the object side to the image side: a first lens L1, a second lens L2, a third lens L3, a fourth lens L4 and a fifth lens L5. An aperture S1 is provided at an object side of the second lens L2, and such optical element as an optical filter GF is provided between the fifth lens L5 and an image surface Si.

In this embodiment, the first lens L1 has a negative refractive power, the second lens L2 has a positive refractive power, the third lens L3 has a negative refractive power, the fourth lens L4 has a positive refractive power, and the fifth lens L5 has a negative refractive power.

Here, a focal length of the camera optical lens 10 is defined as f, a focal length of the first lens L1 is defined as f1, a focal length of the second lens L2 is defined as f2, an on-axis thickness of the second lens L2 is defined as d3, an on-axis distance from an image-side surface of the second lens L2 to an object-side surface of the third lens L3 is defined as d4, an on-axis thickness of the third lens L3 is defined as d5, an on-axis thickness of the fourth lens L4 is defined as d7, an on-axis distance from an image-side surface of the fourth lens L4 to an object-side surface of the fifth lens L5 is defined as d8, and a curvature radius of the object-side surface of the third lens L3 is defined as R5. Herein, f, f1, f2, d3, d4, d5, d7, d8 and R5 satisfy the following conditions:

$$-1.00 \leq (f1+f2)/f \leq -0.10 \quad (1)$$

$$12.00 \leq d3/d4 \leq 20.00 \quad (2)$$

$$5.00 \leq R5/d5 \leq 11.00 \quad (3)$$

$$8.00 \leq d7/d8 \leq 14.00 \quad (4)$$

Herein, condition (1) specifies a ratio between a sum of focal lengths of the first lens L1 and second lens L2 and the focal length of the camera optical lens 10. Within the range specified by condition (1), a spherical aberration and field curvature quantity of the camera optical lens 10 may be effectively balanced.

Condition (2) specifies a ratio between the on-axis thickness of the second lens L2 and the on-axis distance from the image-side surface of the second lens L2 to the object-side surface of the third lens L3. Within the range specified by condition (2), it helps shortening a total optical length from an object-side surface of the first lens L1 to an image surface of the camera optical lens 10 along an optical axis, thereby an ultra-thinness effect is realized.

Condition (3) specifies a ratio between the curvature radius of the object-side surface of the third lens L3 and the on-axis thickness of the third lens L3, within a range of which it helps improving functions of the camera optical lens 10.

Condition (4) specifies a ratio between the on-axis thickness of the fourth lens L4 and the on-axis distance from the image-side surface of the fourth lens L4 to the object-side surface of the fifth lens L5, within a range of which it helps shortening a total optical length from the object-side surface of the first lens L1 to the image surface of the camera optical lens 10 along the optical axis, thereby an ultra-thinness effect is realized.

In this embodiment, a curvature radius of the object-side surface of the second lens L2 is defined as R3, a curvature radius of the image-side surface of the second lens L2 is defined as R4, and the camera optical lens 10 satisfies the following condition:

$$0.05 \leq (R3+R4)/(R3-R4) \leq 0.50 \quad (5)$$

Condition (5) specifies a shape of the second lens L2, within a range of which it helps soften refraction of light that passes through the lens, thereby effectively reducing aberration.

In this embodiment, a focal length of the third lens L3 is defined as f3, a focal length of the fifth lens L5 is defined as f5, and f, f1, f3 and f5 satisfy the following condition:

$$-9.00 \leq (f1+f3+f5)/f \leq -6.50 \quad (6)$$

Condition (6) specifies a ratio between a sum of focal lengths of the first lens L1, third lens L3 and fifth lens L5 and the focal length of the camera optical lens 10. Within the range specified by condition (6), the camera optical lens 10 has better imaging quality and lower sensitivity.

In this embodiment, a curvature radius of the object-side surface of the first lens L1 is defined as R1, a curvature radius of the image-side surface of the first lens L1 is defined as R2, an on-axis thickness of the first lens L1 is defined as d1, a total optical length from the object-side surface of the first lens L1 to the image surface Si of the camera optical lens 10 along the optical axis is defined as TTL, and f1, f, R1, R2, d1 and TTL satisfy the following conditions:

$$-3.71 \leq f1/f \leq -0.76 \quad (7)$$

$$-0.03 \leq (R1+R2)/(R1-R2) \leq 0.67 \quad (8)$$

$$0.03 \leq d1/TTL \leq 0.11 \quad (9)$$

Here, condition (7) specifies a ratio between the focal length of the first lens L1 and the focal length of the camera optical lens 10, within a range of which the first lens L1 has an appropriate negative refractive power that helps reducing aberration of the camera optical lens 10 while facilitating a development of the camera optical lens 10 towards ultra-thin and wide-angle lens.

Condition (8) specifies a shape of the first lens L1, within a range of which the shape of the first lens L1 is reasonably controlled and it enables the first lens L1 to effectively correct the spherical aberration of the camera optical lens 10.

Condition (9) specifies a ratio between the on-axis thickness of the first lens L1 and the total optical length from the object-side surface of the first lens L1 to the image surface Si of the camera optical lens 10 along the optical axis, within a range of which it helps realizing ultra-thinness.

In this embodiment, f2, f, d3 and TTL further satisfy the following conditions:

$$0.43 \leq f2/f \leq 1.51 \quad (10)$$

$$0.08 \leq d3/TTL \leq 0.31 \quad (11)$$

Condition (10) specifies a ratio between the focal length of the second lens L2 and the focal length of the camera optical lens 10, within a range of which and by controlling a positive refractive power of the second lens L2 within a reasonable scope, it helps correct the aberration of the camera optical lens 10.

Condition (11) specifies a ratio between the on-axis thickness of the second lens L2 and the total optical length from the object-side surface of the first lens L1 to the image surface Si of the camera optical lens 10 along the optical axis, which facilitates realizing ultra-thinness.

In this embodiment, a curvature radius of an image-side surface of the third lens L3 is defined as R6, and f3, f, R5, R6, d5 and TTL satisfy the following conditions:

$$-13.07 \leq f3/f \leq -2.12 \quad (12)$$

$$1.64 \leq (R5+R6)/(R5-R6) \leq 7.61 \quad (13)$$

$$0.03 \leq d5/TTL \leq 0.17 \quad (14)$$

Here, condition (12) specifies a ratio between the focal length of the third lens L3 and the focal length of the camera optical lens 10, within a range of which and through reasonable distribution in refractive power the camera optical lens 10 has better imaging quality and lower sensitivity.

Condition (13) specifies a shape of the third lens L3, within a range of which it helps soften refraction of light that passes through the lens, thereby effectively reducing aberration.

Condition (14) specifies a ratio between the on-axis thickness of the third lens L3 and the total optical length from the object-side surface of the first lens L1 to the image surface Si of the camera optical lens 10 along the optical axis, within a range of which it helps facilitating realizing ultra-thinness.

In this embodiment, a focal length of the fourth lens L4 is defined as f4, a curvature radius of an object-side surface of the fourth lens L4 is defined as R7, a curvature radius of the image-side surface of the fourth lens L4 is defined as R8, and f4, f, R7, R8, d7 and TTL satisfy the following conditions:

$$0.48 \leq f4/f \leq 1.85 \quad (15)$$

$$0.62 \leq (R7+R8)/(R7-R8) \leq 3.25 \quad (16)$$

$$0.06 \leq d7/TTL \leq 0.24 \quad (17)$$

Here, condition (15) specifies a ratio between the focal length of the fourth lens L4 and the focal length of the camera optical lens 10, within a range of which it helps improving functions of the camera optical lens 10.

Condition (16) specifies a shape of the fourth lens L4, within a range of which it helps correct such problem as off-axis aberration with the development towards ultra-thin and wide-angle lens.

Condition (17) specifies a ratio between the on-axis thickness of the fourth lens L4 and the total optical length from the object-side surface of the first lens L1 to the image surface Si of the camera optical lens 10 along the optical axis, within a range of which it helps realizing ultra-thinness.

In this embodiment, a curvature radius of the object-side surface of the fifth lens L5 is defined as R9, a curvature radius of an image-side surface of the fifth lens L5 is defined as R10, an on-axis thickness of the fifth lens L5 is defined as d9, and f5, f, R9, R10, d9 and TTL satisfy the following conditions:

$$-3.14 \leq f5/f \leq -0.88 \quad (18)$$

$$1.23 \leq (R9+R10)/(R9-R10) \leq 0.89 \quad (19)$$

$$0.04 \leq d9/TTL \leq 0.14 \quad (20)$$

Condition (18) specifies a ratio between the focal length of the fifth lens L5 and the focal length of the camera optical lens 10, which effectively makes a light angle of the camera optical lens 10 more even, thereby reducing tolerance sensitivity.

Condition (19) specifies a shape of the fifth lens L5, within a range of which it helps correct such problem as off-axis aberration with the development towards ultra-thin and wide-angle lens.

Condition (20) specifies a ratio between the on-axis thickness of the fifth lens L5 and the total optical length from the object-side surface of the first lens L1 to the image surface Si of the camera optical lens 10 along the optical axis, within a range of which it helps realizing ultra-thinness.

In this embodiment, a combined focal length of the first lens L1 and second lens L2 of the camera optical lens 10 is defined as f12, and f12 and f satisfy the following condition:

$$0.48 \leq f12/f \leq 2.68 \quad (21)$$

Within the range specified by condition (21), it removes such problems as aberration and distortion of the camera optical lens 10, limits a rear focal length of the camera optical length 10, and maintains miniaturization of a lens group of the camera optical lens 10.

When the focal length of the camera optical lens 10, focal lengths and curvature radiuses of each lens satisfy the above conditions, the camera optical lens 10 may have good optical functions and may satisfy the design requirement of large aperture, wide angle and ultra-thinness. According to the characteristics of the camera optical lens 10, the camera optical lens 10 is especially fit for WEB camera lenses and mobile phone camera lens assemblies composed by such camera elements as CCD and CMOS for high pixels.

In this embodiment, TTL/IH≤2.30 and FOV≥119.00. Herein, TTL is a total optical length from the object-side surface of the first lens L1 to the image surface Si of the camera optical lens 10 along the optical axis, IH is an image height of the camera optical lens 10 and FOV is a field of view. In this way, the camera optical lens 10 has good optical imaging functions while meeting design requirements of wide angle and ultra-thinness.

In the following, examples will be used to describe the camera optical lens 10 of the present disclosure. The symbols recorded in each example will be described as follows. Besides, focal length, on-axis distance, curvature radius, on-axis thickness, total optical length, inflexion point position, and arrest point position are all in units of mm.

Preferably, inflexion points and/or arrest points can be arranged on the object-side surface and/or the image-side surface of the lens, so as to satisfy the demand for high quality imaging. The description below can be referred for specific implementations.

FIG. 1 is a schematic diagram of a structure of the camera optical lens 10 according to Embodiment 1 of the present disclosure. The design data of the camera optical lens 10 illustrated in FIG. 1 are shown in the following.

Table 1 lists object-side and image-side curvature radiuses R, on-axis thicknesses of lenses, distance d between lenses, refraction indexes nd and abbe numbers vd of the first to fifth lenses L1 to L5 that form the camera optical lens 10 in Embodiment 1 of the present disclosure.

TABLE 1

| | R | d | | nd | | vd |
|---|---|---|---|---|---|---|
| S1 | ∞ | d0= | −0.827 | | | |
| R1 | −2.614 | d1= | 0.280 | nd1 | 1.5450 | v1 | 55.81 |
| R2 | 2.226 | d2= | 0.543 | | | |
| R3 | 1.387 | d3= | 0.696 | nd2 | 1.5450 | v2 | 55.81 |
| R4 | −1.161 | d4= | 0.054 | | | |
| R5 | 2.276 | d5= | 0.211 | nd3 | 1.6610 | v3 | 20.53 |
| R6 | 1.303 | d6= | 0.201 | | | |
| R7 | −3.502 | d7= | 0.573 | nd4 | 1.5450 | v4 | 55.81 |
| R8 | −0.807 | d8= | 0.046 | | | |
| R9 | 1.592 | d9= | 0.355 | nd5 | 1.6610 | v5 | 20.53 |
| R10 | 0.706 | d10= | 0.407 | | | |
| R11 | ∞ | d11= | 0.210 | ndg | 1.5168 | vg | 64.17 |
| R12 | ∞ | d12= | 0.346 | | | |

In the table, meanings of various symbols will be described as follows.

S1: aperture;

R: curvature radius of an optical surface;

R1: curvature radius of the object-side surface of the first lens L1;

R2: curvature radius of the image-side surface of the first lens L1;

R3: curvature radius of the object-side surface of the second lens L2;

R4: curvature radius of the image-side surface of the second lens L2;

R5: curvature radius of the object-side surface of the third lens L3;

R6: curvature radius of the image-side surface of the third lens L3;

R7: curvature radius of the object-side surface of the fourth lens L4;

R8: curvature radius of the image-side surface of the fourth lens L4;

R9: curvature radius of the object-side surface of the fifth lens L5;

R10: curvature radius of the image-side surface of the fifth lens L5;

R11: curvature radius of the object-side surface of the optical filter GF;

R12: curvature radius of the image-side surface of the optical filter GF;

d: on-axis thickness of a lens or on-axis distance between lenses;

d0: on-axis distance from the aperture S1 to the object-side surface of the first lens L1;

d1: on-axis thickness of the first lens L1;

d2: on-axis distance from the image-side surface of the first lens L1 to the object-side surface of the second lens L2;

d3: on-axis thickness of the second lens L2;

d4: on-axis distance from the image-side surface of the second lens L2 to the object-side surface of the third lens L3;

d5: on-axis thickness of the third lens L3;

d6: on-axis distance from the image-side surface of the third lens L3 to the object-side surface of the fourth lens L4;

d7: on-axis thickness of the fourth lens L4;

d8: on-axis distance from the image-side surface of the fourth lens L4 to the object-side surface of the fifth lens L5;

d9: on-axis thickness of the fifth lens L5;

d10: on-axis distance from the image-side surface of the fifth lens L5 to the object-side surface of the sixth lens L6;
d11: on-axis thickness of the optical filter GF;
d12: on-axis distance from the image-side surface of the optical filter GF to the image surface Si;
nd: refractive index of the d line;
nd1: refractive index of the d line of the first lens L1;
nd2: refractive index of the d line of the second lens L2;
nd3: refractive index of the d line of the third lens L3;
nd4: refractive index of the d line of the fourth lens L4;
nd5: refractive index of the d line of the fifth lens L5;
ndg: refractive index of the d line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
vg: abbe number of the optical filter GF.

TABLE 2

| | Conic coefficient | Aspheric surface coefficients | | | |
|---|---|---|---|---|---|
| | k | A4 | A6 | A8 | A10 |
| R1 | 1.3945E+00 | 1.0916E+00 | −2.8938E+00 | 7.5213E+00 | −1.6013E+01 |
| R2 | 7.4211E+00 | 1.2680E+00 | 3.0816E+00 | −8.9854E+01 | 9.0147E+02 |
| R3 | −3.3839E+00 | 7.1046E−01 | −4.1510E+01 | 1.3096E+03 | −2.3342E+04 |
| R4 | −9.4794E−01 | 5.9028E−01 | −4.1386E+01 | 7.1572E+02 | −7.5013E+03 |
| R5 | 7.7780E+00 | 2.7897E−01 | −3.9977E+01 | 5.8766E+02 | −5.3111E+03 |
| R6 | −1.2529E+00 | 6.5565E−01 | −2.0345E+01 | 1.9805E+02 | −1.1735E+03 |
| R7 | 3.0805E+00 | 8.7090E−01 | −3.1801E+00 | −2.3892E+00 | 6.9772E+01 |
| R8 | −2.2649E+00 | 6.5716E−01 | −5.3758E+00 | 2.2320E+01 | −7.7030E+01 |
| R9 | −9.7978E+00 | −5.2690E−03 | −5.3854E+00 | 2.2353E+01 | −6.2261E+01 |
| R10 | −2.3312E+00 | −1.0185E+00 | 1.4572E+00 | −1.5148E+00 | 1.1124E+00 |
| | Aspheric surface coefficients | | | | |
| | A12 | A14 | A16 | A18 | A20 |
| R1 | 2.5333E+01 | −2.8015E+01 | 2.0131E+01 | −8.3489E+00 | 1.5034E+00 |
| R2 | −5.1905E+03 | 1.8348E+04 | −3.9236E+04 | 4.6559E+04 | −2.3616E+04 |
| R3 | 2.5009E+05 | −1.6505E+06 | 6.5653E+06 | −1.4427E+07 | 1.3432E+07 |
| R4 | 5.1278E+04 | −2.2948E+05 | 6.4413E+05 | −1.0233E+06 | 6.9873E+05 |
| R5 | 3.1492E+04 | −1.2257E+05 | 2.9986E+05 | −4.1590E+05 | 2.4813E+05 |
| R6 | 4.4587E+03 | −1.0813E+04 | 1.6132E+04 | −1.3461E+04 | 4.7988E+03 |
| R7 | −2.9457E+02 | 6.4955E+02 | −8.3399E+02 | 5.9719E+02 | −1.8902E+02 |
| R8 | 2.1035E+02 | −3.8198E+02 | 4.1604E+02 | −2.4499E+02 | 6.0135E+01 |
| R9 | 1.2818E+02 | −1.7799E+02 | 1.5033E+02 | −6.8565E+01 | 1.2880E+01 |
| R10 | −4.3030E−01 | −9.8435E−02 | 1.9349E−01 | −8.0562E−02 | 1.1665E−02 |

In Table 2, k is a conic coefficient, and A4, A6, A8, A10, A12, A14, A16, A18 and A20 are aspheric surface coefficients.

$$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16}+A18x^{18}+A20x^{20}$$

For convenience, an aspheric surface of each lens surface uses the aspheric surfaces shown in the above formula. However, the present disclosure is not limited to the aspherical polynomials form shown in the formula.

TABLE 3

| | Number(s) of inflexion points | Inflexion point position 1 | Inflexion point position 2 |
|---|---|---|---|
| P1R1 | 2 | 0.195 | 0.915 |
| P1R2 | 1 | 0.625 | |
| P2R1 | 1 | 0.395 | |
| P2R2 | 1 | 0.565 | |

TABLE 3-continued

| | Number(s) of inflexion points | Inflexion point position 1 | Inflexion point position 2 |
|---|---|---|---|
| P3R1 | 2 | 0.195 | 0.605 |
| P3R2 | 1 | 0.425 | |
| P4R1 | 2 | 0.225 | 0.315 |
| P4R2 | 1 | 0.805 | |
| P5R1 | 2 | 0.265 | 0.925 |
| P5R2 | 2 | 0.345 | 1.355 |

TABLE 4

| | Number(s) of arrest points | Arrest point position 1 |
|---|---|---|
| P1R1 | 1 | 0.375 |
| P1R2 | | |
| P2R1 | | |

TABLE 4-continued

| | Number(s) of arrest points | Arrest point position 1 |
|---|---|---|
| P2R2 | | |
| P3R1 | 1 | 0.345 |
| P3R2 | | |
| P4R1 | | |
| P4R2 | | |
| P5R1 | 1 | 0.445 |
| P5R2 | 1 | 0.775 |

Table 3 and Table 4 show design data of inflexion points and arrest points of the camera optical lens 10 according to Embodiment 1 of the present disclosure. P1R1 and P1R2 represent the object-side surface and the image-side surface of the first lens L1, P2R1 and P2R2 represent the object-side surface and the image-side surface of the second lens L2, P3R1 and P3R2 represent the object-side surface and the image-side surface of the third lens L3, P4R1 and P4R2 represent the object-side surface and the image-side surface of the fourth lens L4, P5R1 and P5R2 represent the object-side surface and the image-side surface of the fifth lens L5. The data in the column named "inflexion point position" refer to vertical distances from inflexion points arranged on each lens surface to the optic axis of the camera optical lens 10. The data in the column named "arrest point position" refer to vertical distances from arrest points arranged on each lens surface to the optical axis of the camera optical lens 10.

In addition, Table 13 in the following shows values corresponding to conditions in Embodiment 1.

Figure 2:
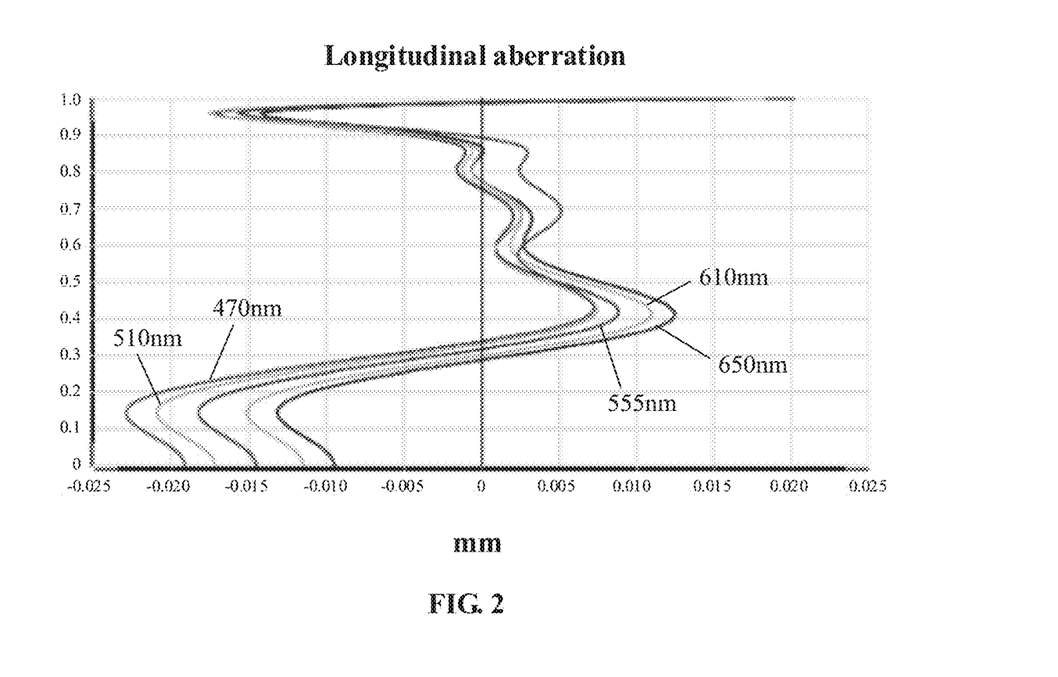
FIG. 2 is a schematic diagram of a longitudinal aberration of the camera optical lens shown in FIG. 1.
Figure 3:
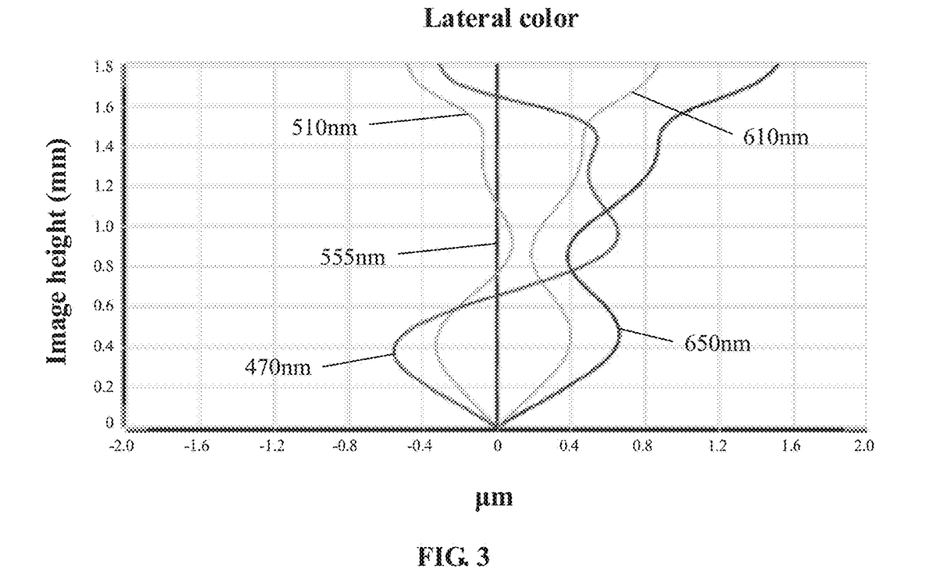
FIG. 3 is a schematic diagram of a lateral color of the camera optical lens shown in FIG. 1.
Figure 4:
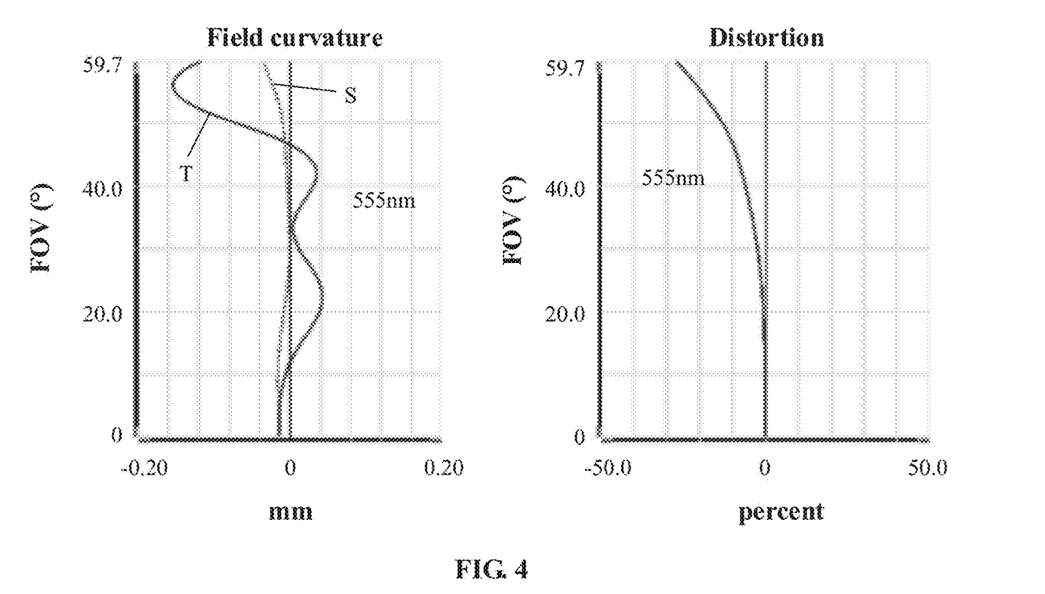
FIG. 4 is a schematic diagram of a field curvature and a distortion of the camera optical lens shown in FIG. 1.

FIG. 2 and FIG. 3 illustrate a longitudinal aberration and a lateral color with wavelengths of 650 nm, 610 nm, 555 nm, 510 nm and 470 nm after passing the camera optical lens 10, respectively. FIG. 4 illustrates a field curvature and a distortion with a wavelength of 555 nm after passing the camera optical lens 10. A field curvature S in FIG. 4 is a field curvature in a sagittal direction, and T is a field curvature in a tangential direction.

In this embodiment, an image height of the camera optical lens 10 is IH, a field of view is FOV, and an entrance pupil diameter is ENPD. Herein, IH=1.815 mm, a FOV in a diagonal direction is 119.40°, i.e., FOV=119.40°, and ENPD=0.650. In this way, the camera optical lens 10 is characterized by large aperture, ultra-thinness and wide angle, and has excellent imaging functions.

Embodiment 2

Figure 5:
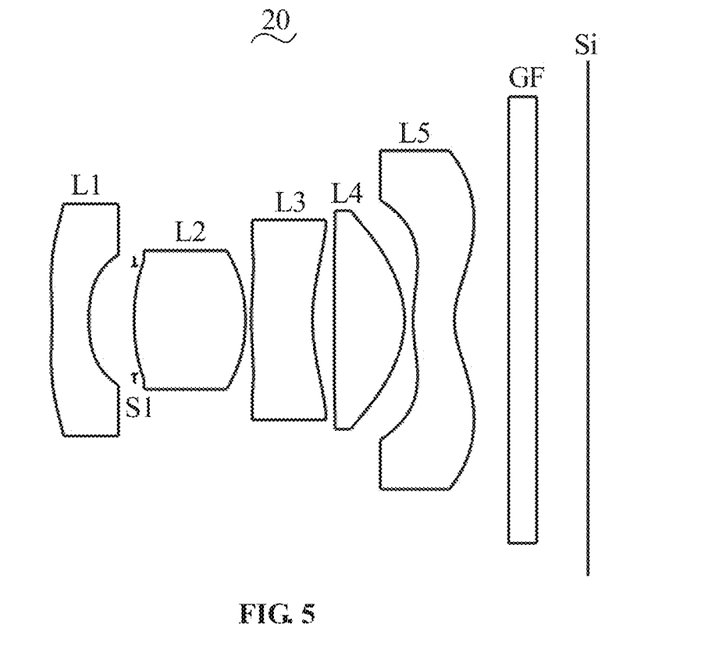
FIG. 5 is a schematic diagram of a structure of a camera optical lens according to Embodiment 2 of the present disclosure.

FIG. 5 is a schematic diagram of a structure of a camera optical lens 20 according to Embodiment 2 of the present disclosure. Embodiment 2 is basically the same as Embodiment 1. Symbols in the following tables having the same meanings as those in Embodiment 1, which is not repeated, but only differences therebetween will be described in the following.

Table 5 and Table 6 show design data of a camera optical lens 20 in Embodiment 2 of the present disclosure.

TABLE 5

|     | R      | d    |       | nd     |     | vd    |
|-----|--------|------|-------|--------|-----|-------|
| S1  | ∞      | d0=  | −0.621 |        |     |       |
| R1  | −3.315 | d1=  | 0.277 | nd1 1.5444 | v1 | 55.82 |
| R2  | 1.277  | d2=  | 0.340 |        |     |       |
| R3  | 1.671  | d3=  | 0.836 | nd2 1.5444 | v2 | 55.82 |
| R4  | −1.249 | d4=  | 0.044 |        |     |       |
| R5  | 2.369  | d5=  | 0.461 | nd3 1.6610 | v3 | 20.53 |
| R6  | 1.589  | d6=  | 0.164 |        |     |       |
| R7  | −6.462 | d7=  | 0.527 | nd4 1.5444 | v4 | 55.82 |
| R8  | −0.704 | d8=  | 0.065 |        |     |       |
| R9  | 1.358  | d9=  | 0.309 | nd5 1.6610 | v5 | 20.53 |
| R10 | 0.598  | d10= | 0.408 |        |     |       |
| R11 | ∞      | d11= | 0.210 | ndg 1.5168 | vg | 64.17 |
| R12 | ∞      | d12= | 0.425 |        |     |       |

TABLE 6

|     | Conic coefficient | Aspheric surface coefficients | | | |
|-----|---------|---------|---------|---------|---------|
|     | k | A4 | A6 | A8 | A10 |
| R1  | −5.8137E+00 | 5.0297E−01 | −9.9307E−01 | 1.8388E+00 | −2.8105E+00 |
| R2  | 3.7470E+00 | 6.8274E−01 | 6.4622E−01 | −1.6140E+01 | 1.3181E+02 |
| R3  | −4.9642E+00 | 2.1719E−01 | −8.1498E−01 | 2.2603E+01 | −4.6758E+02 |
| R4  | −7.2360E−01 | −1.9820E−01 | −2.5284E+00 | 3.7134E+01 | −2.8736E+02 |
| R5  | 1.0152E+01 | −2.7123E−01 | −1.8299E+00 | 1.3810E+01 | −4.9128E+01 |
| R6  | 1.7169E+00 | 1.1470E−01 | −2.4921E+00 | 1.2588E+01 | −3.9603E+01 |
| R7  | 4.0495E+01 | 3.8729E−01 | −1.6526E+00 | 5.1825E+00 | −1.1118E+01 |
| R8  | −2.2364E+00 | 1.6594E−01 | −8.8037E−01 | 1.7550E+00 | −1.8832E+00 |
| R9  | −1.0419E+01 | −2.0292E−01 | −7.4469E−01 | 2.3622E+00 | −3.8526E+00 |
| R10 | −3.5708E+00 | −4.1850E−01 | 5.2103E−01 | −4.8584E−01 | 3.1444E−01 |

|     | Aspheric surface coefficients | | | | |
|-----|---------|---------|---------|---------|---------|
|     | A12 | A14 | A16 | A18 | A20 |
| R1  | 3.1726E+00 | −2.5183E+00 | 1.3133E+00 | −3.9748E−01 | 5.1955E−02 |
| R2  | −6.0380E+02 | 1.7204E+03 | −2.9942E+03 | 2.8497E+03 | −1.0944E+03 |
| R3  | 5.2892E+03 | −3.3824E+04 | 1.2290E+05 | −2.3664E+05 | 1.8745E+05 |
| R4  | 1.4080E+03 | −4.3426E+03 | 8.1484E+03 | −8.5078E+03 | 3.8034E+03 |
| R5  | 9.5821E+01 | −8.8845E+01 | 2.3880E−01 | 5.2174E+01 | −1.4790E+01 |
| R6  | 8.0881E+01 | −1.0727E+02 | 8.8971E+01 | −4.1808E+01 | 8.4440E+00 |
| R7  | 1.5955E+01 | −1.4927E+01 | 8.6842E+00 | −2.8333E+00 | 3.8833E−01 |
| R8  | 8.4976E−01 | 2.6579E−01 | −4.7767E−01 | 1.9983E−01 | −2.5632E−02 |
| R9  | 3.8509E+00 | −2.4447E+00 | 9.5179E−01 | −2.0439E−01 | 1.8598E−02 |
| R10 | −1.3860E−01 | 4.0394E−02 | −7.4066E−03 | 7.6788E−04 | −3.3197E−05 |

Table 7 and table 8 show design data of inflexion points and arrest points of each lens of the camera optical lens 20 lens.

TABLE 7

|      | Number(s) of inflexion points | Inflexion point position 1 | Inflexion point position 2 |
|------|------|--------|--------|
| P1R1 | 2 | 0.165 | 0.785 |
| P1R2 |   |       |       |
| P2R1 |   |       |       |
| P2R2 | 1 | 0.515 |       |
| P3R1 | 2 | 0.215 | 0.565 |
| P3R2 | 1 | 0.465 |       |
| P4R1 | 2 | 0.145 | 0.655 |
| P4R2 | 1 | 0.755 |       |
| P5R1 | 1 | 0.245 |       |
| P5R2 | 1 | 0.315 |       |

TABLE 8

| | Number of arrest points | Arrest point position 1 | Arrest point position 2 |
|---|---|---|---|
| P1R1 | 1 | 0.295 | |
| P1R2 | | | |
| P2R1 | | | |
| P2R2 | | | |
| P3R1 | 1 | 0.415 | |
| P3R2 | | | |
| P4R1 | 2 | 0.315 | 0.755 |
| P4R2 | | | |
| P5R1 | 1 | 0.435 | |
| P5R2 | 1 | 0.765 | |

In addition, Table 13 in the following shows values corresponding to conditions in Embodiment 2.

Figure 6:
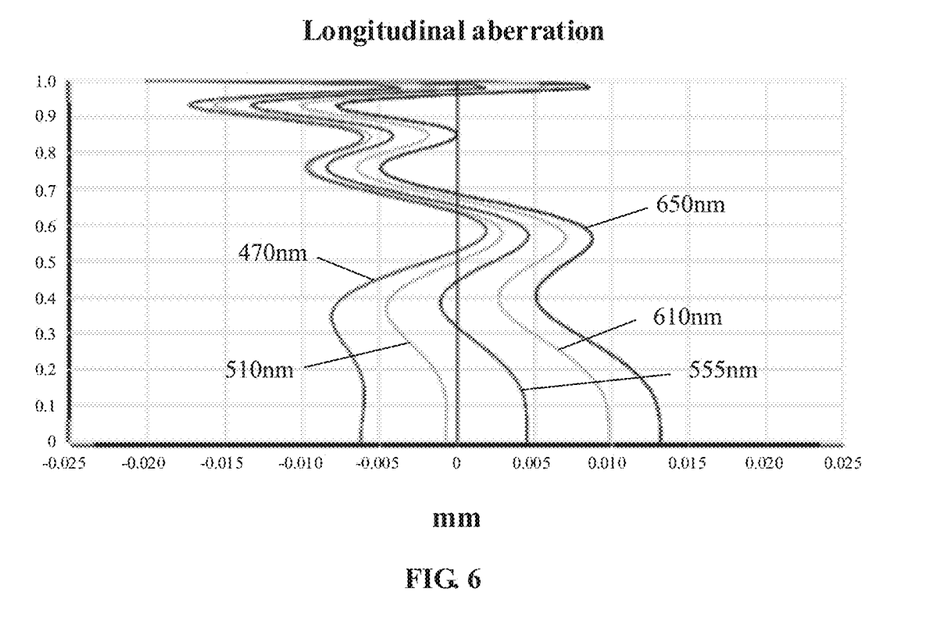
FIG. 6 is a schematic diagram of a longitudinal aberration of the camera optical lens shown in FIG. 5.
Figure 7:
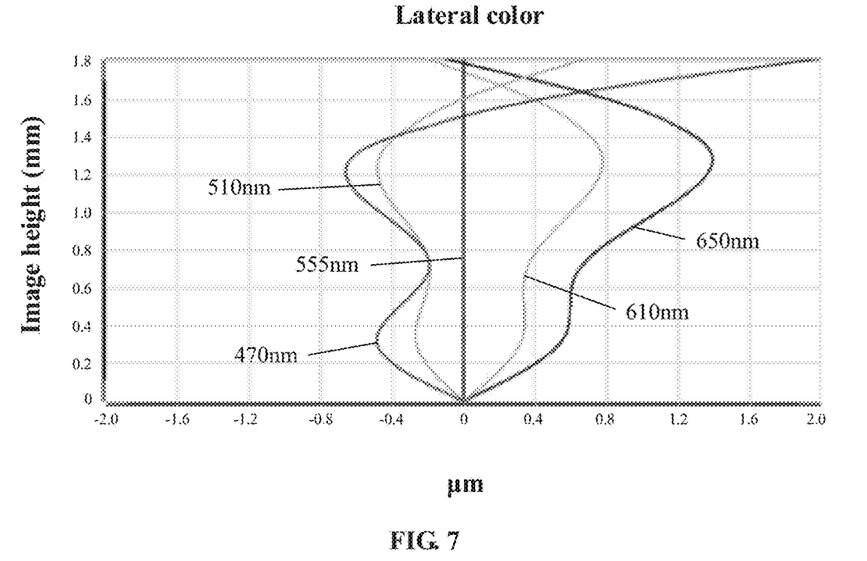
FIG. 7 is a schematic diagram of a lateral color of the camera optical lens shown in FIG. 5.
Figure 8:
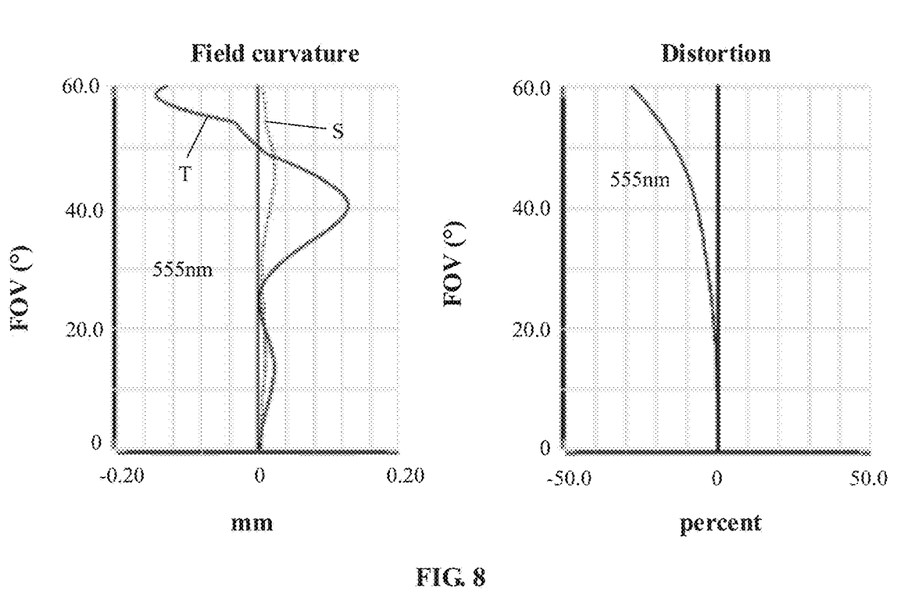
FIG. 8 is a schematic diagram of a field curvature and a distortion of the camera optical lens shown in FIG. 5.

FIG. 6 and FIG. 7 illustrate a longitudinal aberration and a lateral color of light with wavelengths of 650 nm, 610 nm, 555 nm, 510 nm and 470 nm after passing the camera optical lens 20. FIG. 8 illustrates a field curvature and a distortion of light with a wavelength of 555 nm after passing the camera optical lens 20. A field curvature S in FIG. 8 is a field curvature in a sagittal direction, and T is a field curvature in a tangential direction.

In this embodiment, an image height of the camera optical lens 20 is IH, a field of view is FOV, and an entrance pupil diameter is ENPD. Herein, IH=1.815 mm, a FOV in a diagonal direction is 120.00°, i.e., FOV=120.00°, and ENPD=0.654. In this way, the camera optical lens 20 is characterized by large aperture, ultra-thinness and wide angle, and has excellent imaging functions.

Embodiment 3

Figure 9:
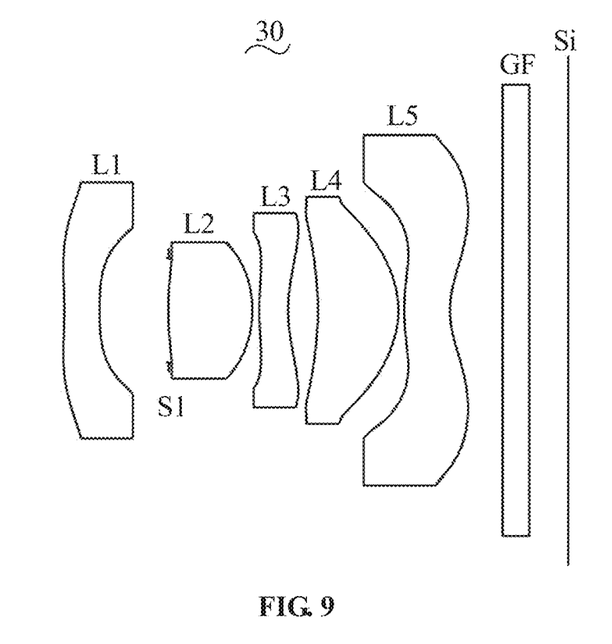
FIG. 9 is a schematic diagram of a structure of a camera optical lens according to Embodiment 3 of the present disclosure.

FIG. 9 is a schematic diagram of a structure of a camera optical lens 30 according to Embodiment 3 of the present disclosure. Embodiment 3 is basically the same as Embodiment 1. Symbols in the following tables having the same meanings as those in Embodiment 1, which is not repeated, but only differences therebetween will be described in the following.

Table 9 and Table 10 show design data of a camera optical lens 30 in Embodiment 2 of the present disclosure.

TABLE 9

| | R | d | | nd | | vd |
|---|---|---|---|---|---|---|
| S1 | ∞ | d0= | −0.809 | | | |
| R1 | −2.901 | d1= | 0.272 | nd1 | 1.5450 | v1 55.81 |
| R2 | 2.991 | d2= | 0.533 | | | |
| R3 | 2.489 | d3= | 0.651 | nd2 | 1.5450 | v2 55.81 |
| R4 | −0.844 | d4= | 0.054 | | | |
| R5 | 2.460 | d5= | 0.224 | nd3 | 1.6610 | v3 20.53 |
| R6 | 1.309 | d6= | 0.232 | | | |
| R7 | −1.901 | d7= | 0.623 | nd4 | 1.5450 | v4 55.81 |
| R8 | −0.700 | d8= | 0.045 | | | |
| R9 | 1.679 | d9= | 0.354 | nd5 | 1.6610 | v5 20.53 |
| R10 | 0.706 | d10= | 0.407 | | | |
| R11 | ∞ | d11= | 0.210 | ndg | 1.5168 | vg 64.17 |
| R12 | ∞ | d12= | 0.300 | | | |

TABLE 10

| | Conic coefficient | Aspherical surface coefficients | | | |
|---|---|---|---|---|---|
| | k | A4 | A6 | A8 | A10 |
| R1 | −1.2310E+00 | 1.1193E+00 | −2.9069E+00 | 7.5084E+00 | −1.6023E+01 |
| R2 | 8.7896E+00 | 1.4187E+00 | 2.8361E+00 | −8.9150E+01 | 9.0374E+02 |
| R3 | −4.5133E+00 | 8.1791E−01 | −4.7101E+01 | 1.3425E+03 | −2.3296E+04 |
| R4 | −2.8166E+00 | 5.7189E−01 | −4.2200E+01 | 7.1514E+02 | −7.5049E+03 |
| R5 | 8.9118E+00 | 5.8506E−01 | −4.0320E+01 | 5.8454E+02 | −5.3049E+03 |
| R6 | −2.1103E+00 | 6.3280E−01 | −2.0264E+01 | 1.9759E+02 | −1.1749E+03 |
| R7 | 1.7179E+00 | 8.6657E−01 | −3.0781E+00 | −2.4065E+00 | 6.9553E+01 |
| R8 | −1.7946E+00 | 6.6549E−01 | −5.4380E+00 | 2.2209E+01 | −7.7056E+01 |
| R9 | −6.5149E+00 | −3.9922E−02 | −5.4219E+00 | 2.2314E+01 | −6.2283E+01 |
| R10 | −2.3445E+00 | −1.0223E+00 | 1.4532E+00 | −1.5162E+00 | 1.1125E+00 |

| | Aspherical surface coefficients | | | | |
|---|---|---|---|---|---|
| | A12 | A14 | A16 | A18 | A20 |
| R1 | 2.5326E+01 | −2.8007E+01 | 2.0141E+01 | −8.3622E+00 | 1.5056E+00 |
| R2 | −5.1961E+02 | 1.8327E+03 | −3.9241E+04 | 4.6893E+04 | −2.4133E+04 |
| R3 | 2.4929E+05 | −1.6540E+06 | 6.5813E+06 | −1.4280E+07 | 1.2835E+07 |
| R4 | 5.1328E+04 | −2.2930E+05 | 6.4337E+05 | −1.0269E+06 | 7.0951E+05 |
| R5 | 3.1530E+04 | −1.2262E+05 | 2.9956E+05 | −4.1596E+05 | 2.4950E+05 |
| R6 | 4.4604E+03 | −1.0805E+04 | 1.6123E+04 | −1.3501E+04 | 4.8576E+03 |
| R7 | −2.9464E+02 | 6.5020E+02 | −8.3362E+02 | 5.9652E+02 | −1.8554E+02 |
| R8 | 2.1033E+02 | −3.8187E+02 | 4.1629E+02 | −2.4480E+02 | 6.0327E+01 |
| R9 | 1.2817E+02 | −1.7800E+02 | 1.5035E+02 | −6.8528E+01 | 1.2892E+01 |
| R10 | −4.2989E−01 | −9.8172E−02 | 1.9361E−01 | −8.0542E−02 | 1.1647E−02 |

Table 11 and Table 12 show design data inflexion points and arrest points of the respective lenses in the camera optical lens 30.

TABLE 11

| | Number(s) of inflexion points | Inflexion point position 1 | Inflexion point position 2 |
|---|---|---|---|
| P1R1 | 2 | 0.185 | 0.865 |
| P1R2 | 1 | 0.615 | |
| P2R1 | 1 | 0.305 | |
| P2R2 | | | |
| P3R1 | 1 | 0.205 | |
| P3R2 | 2 | 0.355 | 0.735 |

TABLE 11-continued

|  | Number(s) of inflexion points | Inflexion point position 1 | Inflexion point position 2 |
|---|---|---|---|
| P4R1 | 1 | 0.645 |  |
| P4R2 | 1 | 0.755 |  |
| P5R1 | 2 | 0.265 | 0.915 |
| P5R2 | 2 | 0.345 | 1.315 |

TABLE 12

|  | Number of arrest points | Arrest point position 1 |
|---|---|---|
| P1R1 | 1 | 0.335 |
| P1R2 |  |  |
| P2R1 |  |  |
| P2R2 |  |  |
| P3R1 | 1 | 0.365 |
| P3R2 | 1 | 0.625 |
| P4R1 | 1 | 0.765 |
| P4R2 |  |  |
| P5R1 | 1 | 0.435 |
| P5R2 | 1 | 0.765 |

In addition, Table 13 in the following shows values corresponding to conditions in Embodiment 3.

Figure 10:
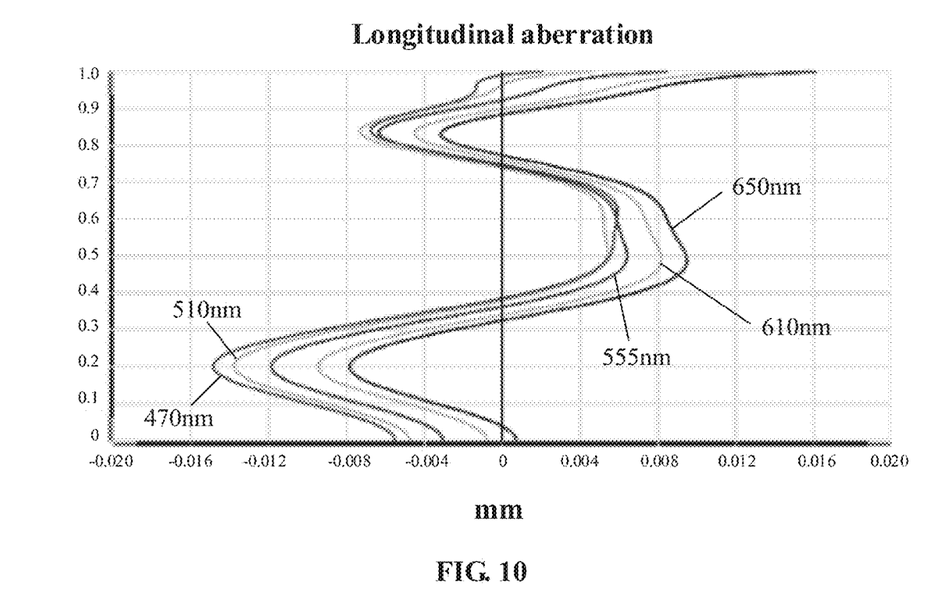
FIG. 10 is a schematic diagram of a longitudinal aberration of the camera optical lens shown in FIG. 9.
Figure 11:
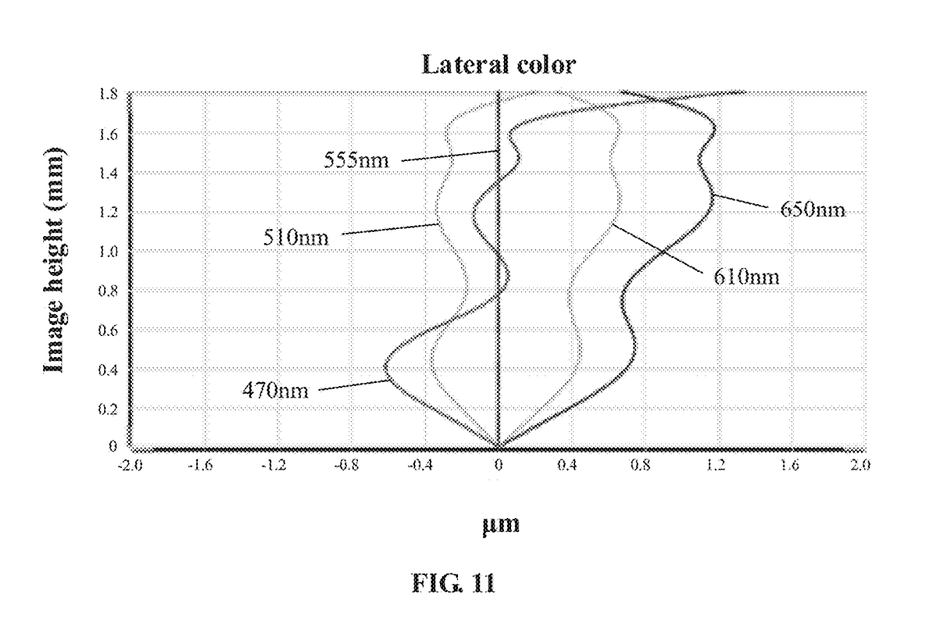
FIG. 11 is a schematic diagram of a lateral color of the camera optical lens shown in FIG. 9.
Figure 12:
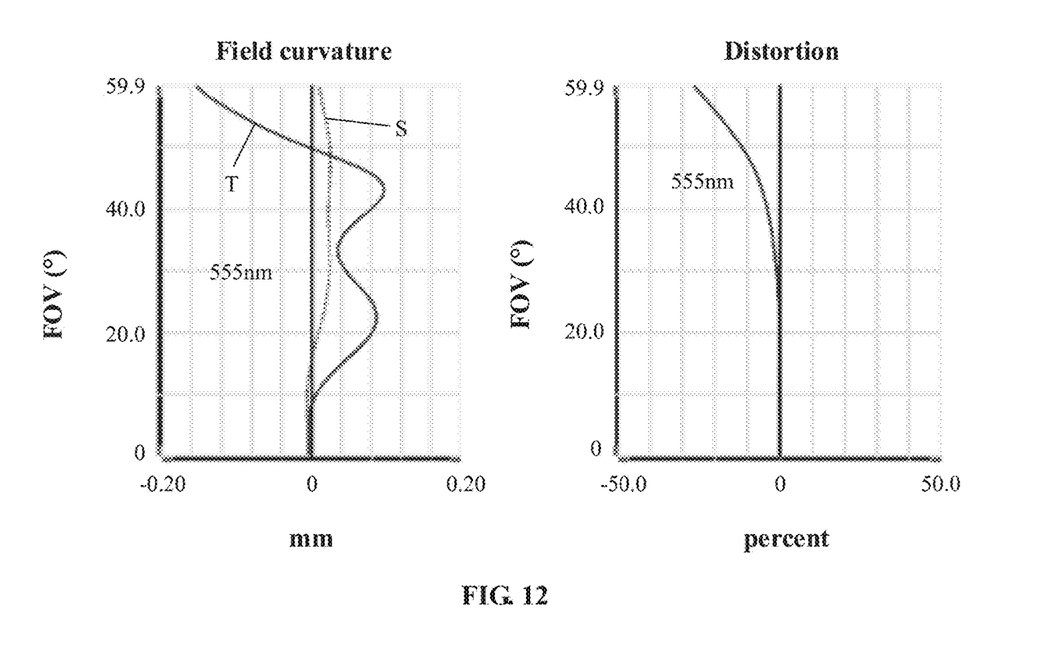
FIG. 12 is a schematic diagram of a field curvature and a distortion of the camera optical lens shown in FIG. 9.

FIG. 10 and FIG. 11 illustrate a longitudinal aberration and a lateral color of light with wavelengths of 650 nm, 610 nm, 555 nm, 510 nm and 470 nm after passing the camera optical lens 30. FIG. 12 illustrates a field curvature and a distortion of light with a wavelength of 555 nm after passing the camera optical lens 30. A field curvature S in FIG. 12 is a field curvature in a sagittal direction, and T is a field curvature in a tangential direction.

In this embodiment, an image height of the camera optical lens 30 is IH, a field of view is FOV, and an entrance pupil diameter is ENPD. Herein, IH=1.815 mm, a FOV in a diagonal direction is 119.80°, i.e., FOV=119.80°, and ENPD=0.643. In this way, the camera optical lens 30 is characterized by large aperture, ultra-thinness and wide angle, and has excellent imaging functions.

Table 13 in the following lists equivalent parameters in Embodiment 1, Embodiment 2 and Embodiment 3 in accordance with the above conditions and values of conditions (1), (2), (3) and (4).

TABLE 13

| Parameters and conditions | Embodiment 1 | Embodiment 2 | Embodiment 3 | Notes |
|---|---|---|---|---|
| (f1 + f2)/f | −0.61 | −0.14 | −0.99 | Condition (1) |
| d3/d4 | 12.89 | 19.00 | 12.06 | Condition (2) |
| R5/d5 | 10.79 | 5.14 | 10.98 | Condition (3) |
| d7/d8 | 12.46 | 8.11 | 13.84 | Condition (4) |
| f | 1.442 | 1.451 | 1.429 |  |
| f1 | −2.155 | −1.653 | −2.650 |  |
| f2 | 1.279 | 1.456 | 1.238 |  |
| f3 | −5.000 | −9.482 | −4.551 |  |
| f4 | 1.783 | 1.402 | 1.711 |  |
| f5 | −2.263 | −1.911 | −2.136 |  |
| FNO | 2.218 | 2.219 | 2.222 |  |

Those skilled in the art should appreciate that the aforementioned embodiments are specific embodiments for implementing the present invention. In practice, however, many changes can be made in the forms and details of the specific embodiments without departing from the spirit and scope of the invention.

What is claimed is:

1. A camera optical lens comprising, from an object side to an image side:
   a first lens having a negative refractive power;
   an aperture;
   a second lens having a positive refractive power;
   a third lens having a negative refractive power;
   a fourth lens having a positive refractive power; and
   a fifth lens having a negative refractive power;
   wherein the camera optical lens satisfies following conditions:

$-1.00 \leq (f1+f2)/f \leq -0.10$;

$12.00 \leq d3/d4 \leq 20.00$;

$5.00 \leq R5/d5 \leq 11.00$; and $8.00 \leq d7/d8 \leq 14.00$;

where
   f denotes a focal length of the camera optical lens,
   f1 denotes a focal length of the first lens,
   f2 denotes a focal length of the second lens,
   d3 denotes an on-axis thickness of the second lens,
   d4 denotes an on-axis distance from an image-side surface of the second lens to an object-side surface of the third lens,
   d5 denotes an on-axis thickness of the third lens,
   d7 denotes an on-axis thickness of the fourth lens,
   d8 denotes an on-axis distance from an image-side surface of the fourth lens to an object-side surface of the fifth lens, and
   R5 denotes a curvature radius of the object-side surface of the third lens.

2. The camera optical lens according to claim 1 further satisfying the following condition:

$0.05 \leq (R3+R4)/(R3-R4) \leq 0.50$;

where
   R3 denotes a curvature radius of an object-side surface of the second lens, and
   R4 denotes a curvature radius of the image-side surface of the second lens.

3. The camera optical lens according to claim 1 further satisfying the following condition:

$-9.00 \leq (f1+f3+f5)/f \leq -6.50$;

where
   f3 denotes a focal length of the third lens, and
   f5 denotes a focal length of the fifth lens.

4. The camera optical lens according to claim 1 further satisfying the following conditions:

$-3.71 \leq f1/f \leq -0.76$;

$-0.03 \leq (R1+R2)/(R1-R2) \leq 0.67$;

$0.03 \leq d1/TTL \leq 0.11$;

where
   R1 denotes a curvature radius of an object-side surface of the first lens,
   R2 denotes a curvature radius of an image-side surface of the first lens,
   d1 denotes an on-axis thickness of the first lens, and
   TTL denotes a total optical length from the object-side surface of the first lens to an image surface of the camera optical lens along an optical axis.

5. The camera optical lens according to claim 1 further satisfying the following conditions:

$$0.43 \leq f2/f \leq 1.51; \text{ and}$$

$$0.08 \leq d3/TTL \leq 0.31;$$

where

TTL denotes a total optical length from an object-side surface of the first lens to an image surface of the camera optical lens along an optical axis.

6. The camera optical lens according to claim 1 further satisfying the following conditions:

$$-13.07 \leq f3/f \leq -2.12;$$

$$1.64 \leq (R5+R6)/(R5-R6) \leq 7.61; \text{ and}$$

$$0.03 \leq d5/TTL \leq 0.17;$$

where f3 denotes a focal length of the third lens,

R6 denotes a curvature radius of an image-side surface of the third lens, and

TTL denotes a total optical length from an object-side surface of the first lens to an image surface of the camera optical lens along an optical axis.

7. The camera optical lens according to claim 1 further satisfying the following conditions:

$$0.48 \leq f4/f \leq 1.85;$$

$$0.62 \leq (R7+R8)/(R7-R8) \leq 3.25; \text{ and}$$

$$0.06 \leq d7/TTL \leq 0.24;$$

where f4 denotes a focal length of the fourth lens,

R7 denotes a curvature radius of an object-side surface of the fourth lens,

R8 denotes a curvature radius of the image-side surface of the fourth lens, and

TTL denotes a total optical length from an object-side surface of the first lens to an image surface of the camera optical lens along an optical axis.

8. The camera optical lens according to claim 1 further satisfying the following conditions:

$$-3.14 \leq f5/f \leq -0.88;$$

$$1.23 \leq (R9+R10)/(R9-R10) \leq 3.89; \text{ and}$$

$$0.04 \leq d9/TTL \leq 0.14;$$

where f5 denotes a focal length of the fifth lens,

R9 denotes a curvature radius of the object-side surface of the fifth lens,

R10 denotes a curvature radius of an image-side surface of the fifth lens, d9 denotes an on-axis thickness of the fifth lens, and TTL denotes a total optical length from an object-side surface of the first lens to an image surface of the camera optical lens along an optical axis.

9. The camera optical lens according to claim 1 further satisfying the following condition:

$$0.48 \leq f12/f \leq 2.68;$$

where f12 denotes a combined focal length of the first lens and second lens.

10. The camera optical lens according to claim 1 further satisfying the following condition:

$$TTL/IH \leq 2.30;$$

where

TTL denotes a total optical length from an object-side surface of the first lens to an image surface of the camera optical lens along an optical axis, and IH denotes an image height of the camera optical lens.

* * * * *